(12) United States Patent
Moliton et al.

(10) Patent No.: US 7,791,806 B2
(45) Date of Patent: Sep. 7, 2010

(54) OPHTHALMOLOGICAL DISPLAY INCLUDING A DEVICE FOR ADJUSTING TO THE USER'S PUPIL SPACING

(75) Inventors: Renaud Moliton, Charenton-le-Pont (FR); Benjamin Rousseau, Charenton-le-Pont (FR)

(73) Assignee: Essilor Int'l (Compagnie Generale d'Optique) (FR)

( * ) Notice: Subject to any disclaimer, the term of this patent is extended or adjusted under 35 U.S.C. 154(b) by 491 days.

(21) Appl. No.: 11/631,566

(22) PCT Filed: Jun. 21, 2005

(86) PCT No.: PCT/FR2005/050475

§ 371 (c)(1),
(2), (4) Date: Aug. 9, 2007

(87) PCT Pub. No.: WO2006/030137

PCT Pub. Date: Mar. 23, 2006

(65) Prior Publication Data
US 2008/0049339 A1     Feb. 28, 2008

(30) Foreign Application Priority Data
Jul. 2, 2004     (FR) .................................. 04 51426

(51) Int. Cl.
G02B 7/02     (2006.01)
G02B 27/14    (2006.01)
A61B 3/00     (2006.01)

(52) U.S. Cl. .................. 359/630; 351/200; 359/815

(58) Field of Classification Search .............. 359/462, 359/630–633, 815; 348/53, 115; 351/200
See application file for complete search history.

(56) References Cited

U.S. PATENT DOCUMENTS

| | | | |
|---|---|---|---|
| 5,129,716 A * | 7/1992 | Holakovszky et al. | 351/50 |
| 5,486,841 A | 1/1996 | Hara et al. | 345/8 |
| 5,539,422 A | 7/1996 | Heacock et al. | 345/8 |
| 5,880,773 A | 3/1999 | Suzuki | 348/115 |
| 6,177,952 B1 | 1/2001 | Tabata et al. | 348/47 |
| 6,384,982 B1 | 5/2002 | Spitzer et al. | 359/630 |
| 7,016,116 B2 * | 3/2006 | Dolgoff | 359/630 |
| 2002/0113755 A1 | 8/2002 | Lee | 345/7 |

OTHER PUBLICATIONS

International Search Report—Oct. 20, 2005.
French Search Report—Oct. 28, 2005.

* cited by examiner

*Primary Examiner*—Jessica T Stultz
*Assistant Examiner*—Mahidere S Sahle
(74) *Attorney, Agent, or Firm*—Sofer & Haroun, LLP

(57) ABSTRACT

The invention relates to an ophthalmological display comprising an optical imager (10) for shaping light beams emitted by a miniature screen (20) of a light beam generator system and for directing the beams towards the eye (O) of the wearer to enable an image (I) to be viewed, said imager presenting an outlet optical axis (A). According to the invention, the display includes a device for adjusting to the user's pupil spacing, the device including means for adjusting the position of said image (I1, I2) in a plane substantially perpendicular to said optical axis (A).

12 Claims, 5 Drawing Sheets

OPHTHALMOLOGICAL DISPLAY INCLUDING A DEVICE FOR ADJUSTING TO THE USER'S PUPIL SPACING

RELATED APPLICATIONS

The present application is a national phase application of PCT/FR2005/050475, which in turn claims the benefit of priority from French Patent Applications No. 04 51426, filed on Jul. 2, 2004, the entirety of which are incorporated herein by reference.

FIELD OF THE INVENTION

The present invention relates to an ophthalmological display comprising an ophthalmic lens and an optical imager for enabling information of the image or multimedia type to be projected. The term "lens" is used herein to mean an optical system suitable in particular for being positioned in a frame for eyeglasses.

BACKGROUND OF THE INVENTION

U.S. Pat. No. 5,886,822 discloses an ophthalmic lens presenting a projection insert. Such a projection insert is constituted by an optical imager for shaping light beams delivered by an electronic and optical system for generating light beams from an electronic signal, of the miniature screen, laser diode, or light-emitting diode (LED) type. The optical semiconductor directs light beams towards the eye of the wearer in order to enable information content to be viewed.

An example of a prior art display is shown diagrammatically in greater detail in FIG. 1.

By way of example, the optical imager is of the same type as described in above-mentioned U.S. Pat. No. 5,886,822.

An electronic signal carrying information is brought to a miniature screen 1 by a cable 7. On the basis of this signal, the miniature screen 1, illuminated by a background projector, generates a pixel image corresponding to the information. By way of example, it is possible to use a "Kopin Cyberdisplay 320 color" screen generating images comprising 320×240 pixels and having dimensions of 4.8 millimeters (mm)×3.6 mm. The screen 1 is held by a mechanical interface 3 in position relative to the optical imager 5. A protective shell 4 protects all or part of the assembly. The screen 1 is associated with optical components 8, in this case a mirror and a lens.

The optical imager 5 comprises a propagation prism 5a, a counter prism 5b, a quarterwave plate 5c, and a spherical Mangin mirror 5d. The spherical Mangin mirror is a plano-spherical lens whose spherical face has been made reflecting by aluminum plating treatment or the equivalent.

The imager 5 also includes polarization separator treatment 6 which may be implemented in the form of a deposit of thin layers either on the propagation prism 5a or on the counter prism 5b, or by means of a film stuck between the two above-mentioned elements.

The imager 5 is embedded in a molded lens 9 and the housing is placed facing forwards against the back of the lens, with reflection treatment 5e then being included in the lens. On the same principle, the housing could be disposed to one side of the lens 9, and then the reflecting element 5e would be absent.

The word "lens" is used in particular for an optionally correcting lens suitable for mounting in a frame for eyeglasses. This ophthalmic lens presents conventional functions such as correcting eyesight, and coatings against reflection, dirtying, scratching, etc.

FIG. 1 shows an ideal position for the eye O centered on the outlet optical axis A of the imager, with the image also being centered on said axis A. Such a perfect position can be achieved by positioning the imager 5 accurately in or on the lens 9 for a given user. Nevertheless, such a lens fitted with an imager and generally mounted in a frame for eyeglasses or an equivalent support must be suitable for being used effectively by a plurality of wearers presenting different morphology.

In particular, pupil spacing, i.e. the distance between the two pupils of the wearer, varies from person to person. As a result, for a given pair of information eyeglasses, a problem arises as shown in FIG. 2.

This figure shows only the lens 9 with the counter-prism 5b, the quarterwave plate 5c, and the spherical Mangin mirror 5d, represented by a cube 5A referred to as a "combiner". The combiner 5A acts like a window, and for an eye O that lies off the optical axis A, as shown in FIG. 2, the combiner blocks some of the light rays because of its defined dimensions. This results in a vignetting phenomenon which is an optical effect that darkens certain portions of the image I, in general its periphery, and which makes it difficult to observe. As shown in FIG. 2, only the portion P of the image can be seen correctly by the eye O.

OBJECTS AND SUMMARY OF THE INVENTION

To solve this problem, the invention proposes adapting the position of the image I, as shown diagrammatically in FIG. 3 by adjusting the display so that the information image I is properly adapted to the position of the eye of the wearer and can be seen in full through the window constituted by the combiner 5A.

The invention solves this problem while proposing a display of overall size that does not change and that is comfortable to manipulate for adjustment purposes.

The invention thus provides an ophthalmological display comprising an optical imager for shaping light beams emitted by a miniature screen of a light beam generator system and for directing the beams towards the eye of the wearer so as to enable an image to be viewed, said imager presenting an outlet optical axis, said imager being integrated in a lens for mounting in a frame for eyeglasses, the display being characterized in that it includes a device for adjusting to the user's pupil spacing, said device comprising means for adjusting the position of said image in a plane substantially perpendicular to said optical axis, said adjustment device being internal to a housing containing said system for generating light beams.

In a preferred embodiment, said generator system comprises a stationary part, referred to as a stationary plate, having connected thereto said screen by means of a moving connection in such a manner that said screen can be moved in translation in its longitudinal plane.

In the invention, the housing serves only to provide protection against attack from the surrounding medium, from impacts and from flattening, and also to provide a sealing function, and the housing is preferably removable, being put into place last. The hosing is advantageously put into place by being secured to the stationary plate or part.

Advantageously, said screen is secured to a second plate connected to the stationary first plate via said moving connection.

Said connection may be an elastically-deformable element, preferably constituted by a deformable bracket.

The dimensional and positioning characteristics of this deformable element can be calculated by finite element type calculation methods in order to determine the characteristics of the displacement.

Advantageously, said moving connection is adjustable by an actuator device.

And more precisely, said actuator device is internal to said housing.

In a first variant, said actuator device is constituted by a knob provided with an eccentric cylinder, said knob turning on a stationary portion of the housing and said eccentric cylinder being in abutment against said second plate.

This actuator device presents the advantage of being suitable for being automatically prestressed so as to avoid any slack and determine the amount of force that needs to be exerted on the knob so as to improve user comfort and avoid any damage. Furthermore, by turning the knob continuously in the same direction, it is possible to pass through all desired positions on the path of the moving plate. Finally, because of its relatively large size, a knob is particularly adapted to achieving very small displacements accurately.

In a second variant, said actuator device is constituted by a screw screwed in a stationary portion of the housing and in abutment against said second plate.

Preferably, an adapter is in a reference position relative to the display and receives said generator system provided with its adjustment device by engagement of at least two studs.

This embodiment presents the advantage of decoupling the various optical and mechanical functions. Each part performs one function only, thus enabling maximum precision to be obtained, whether mechanically or optically. The adapter ensures that the device is positioned relative to the imager.

And preferably, said adapter is secured to said stationary plate.

The adapter can be secured to the lens by adhesive, screw-fastening, or any appropriate means.

The connection between said system and said adapter may be releasable.

Advantageously, said stationary plate carries an associated optical component.

In a preferred application, said imager is integrated in a lens.

BRIEF DESCRIPTION OF THE DRAWINGS

The invention is described below in greater detail with reference to figures that merely show a preferred embodiment of the invention.

DETAILED DESCRIPTION

Figure 4:
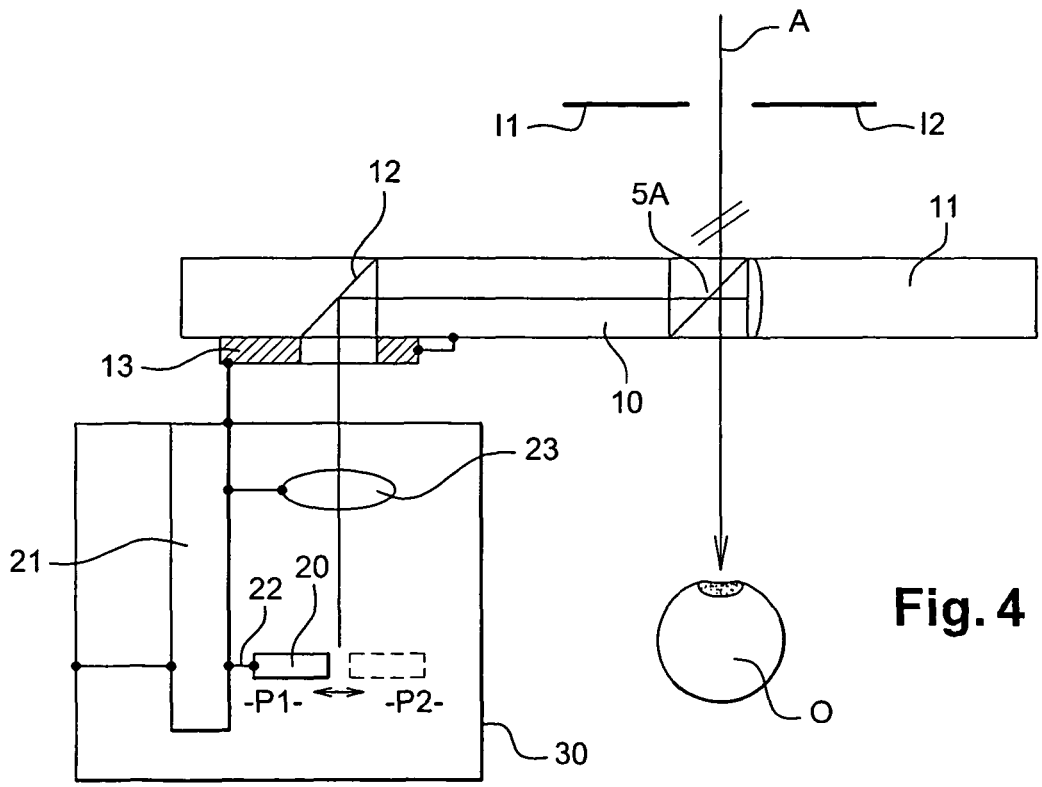
FIG. 4 is a diagrammatic plan view of a display in accordance with the invention.
Figure 2:
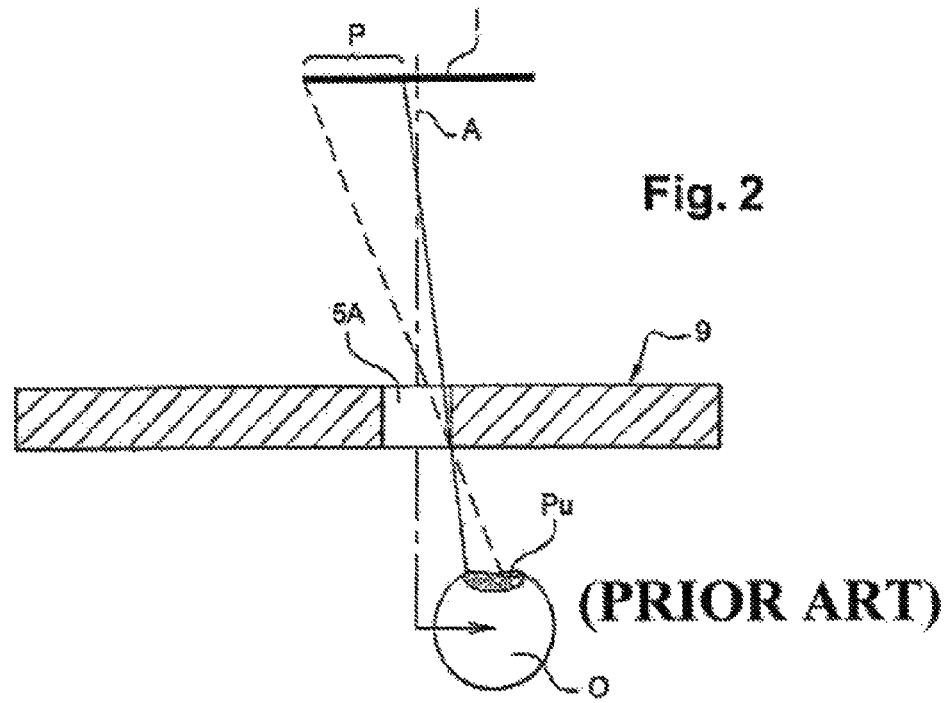
FIG. 2 is an illustration of the technical problem posed by that type of prior art type display.
Figure 3:
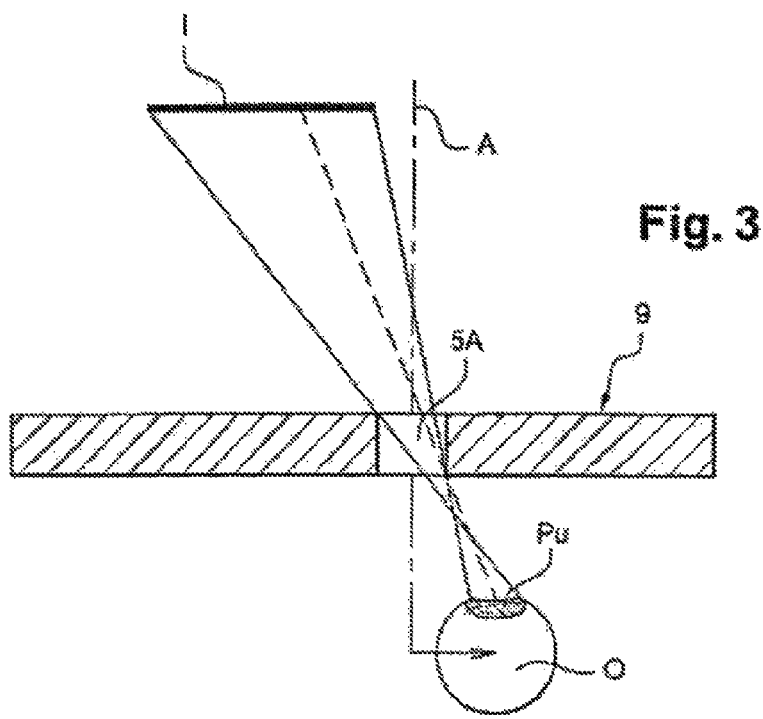
FIG. 3 is an illustration of the solution proposed by a display in accordance with the invention.

The display in accordance with the invention is thus shown diagrammatically in FIG. 4.

Figure 1:
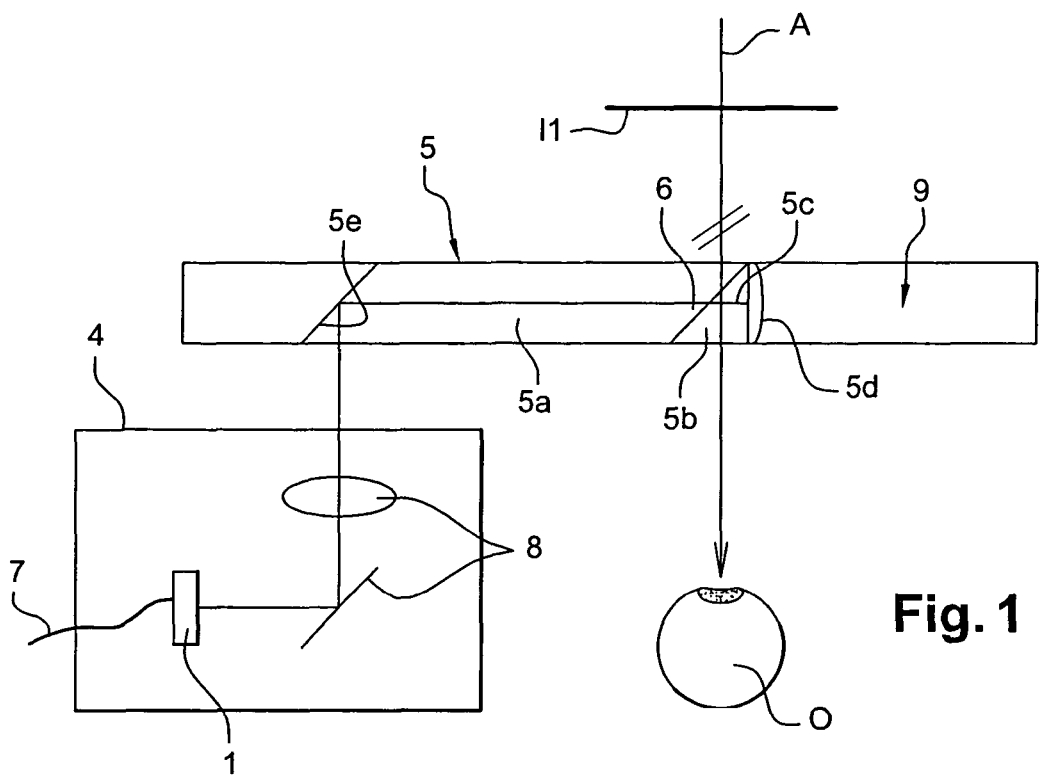
FIG. 1 is a diagrammatic plan view of a prior art display, described above.

This ophthalmological display comprises an optical imager 10 for shaping light beams emitted by a miniature screen 20 disposed in a housing 30 and for directing the beams towards the eye O of the wearer so as to enable information content to be viewed. The imager 10 is of the same type as that shown in FIG. 1. The housing 30 is placed on the rear face of the lens. A reflector element 12 for reflecting the light beam through 90° is also integrated in the lens so as to direct the beam longitudinally towards the imager 10.

However, as will readily be understood, the invention applies equally well to an imager of the type shown in FIG. 4 and to an imager that is not associated with such a reflector element 12, in which case the housing 30 connects to the lens or eyeglass 11 carrying the imager via a side face thereof.

Firstly, an adapter 13 is bonded accurately by adhesive on the lens and then the adjustment device as described below is secured to the adapter. The adapter 13 has two accurately-perpendicular sides that enable it to be positioned accurately relative to the imager, and more precisely relative to the reflector element 12.

The adjustment device contains a stationary plate 21 which is connected to the miniature screen 20 via an adjustable moving connection 22. It also supports optical components 23 represented diagrammatically, e.g. a lens. It is this stationary plate 21 that is secured to the adapter 13.

By adjusting the connection 22, e.g. from position P1 to position P2 where the screen is represented by dashed lines, the screen 20 is moved in translation in its longitudinal plane, enabling the image I1 to be viewed shifted in a plane substantially perpendicular to the optical axis A, as represented by the image I2.

Figure 5A:
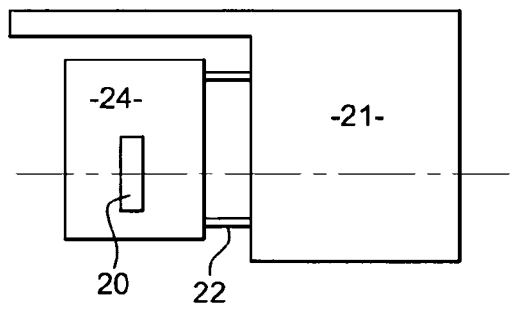
FIGS. 5A and 5B are diagrammatic views of the device for adjusting to pupil spacing in accordance with the invention.
Figure 5B:
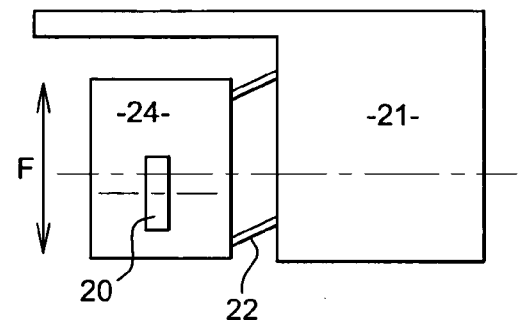

The connection 22 is shown diagrammatically in FIGS. 5A and 5B.

The generator system comprises a stationary part 21 referred to as a stationary plate, having the screen 20 connected thereto by a moving connection 22 enabling the screen to be moved in translation in its own longitudinal plane in the direction of arrow F, thereby enabling an image to be viewed that is offset in a plane substantially perpendicular to the optical axis. To do this, the miniature screen 20 is secured to a second plate 24 that is connected to the stationary first plate 21 by a moving connection 22.

Figure 6:
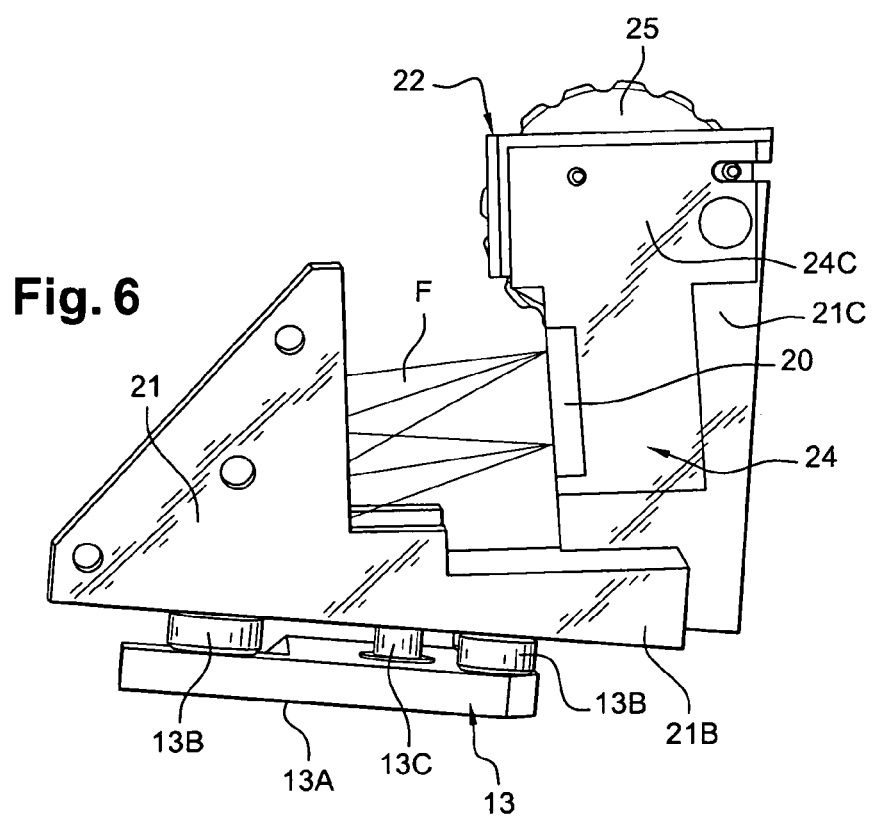
FIG. 6 is a face view of a device for adjusting to pupil facing of a display in accordance with the invention.
Figure 7:
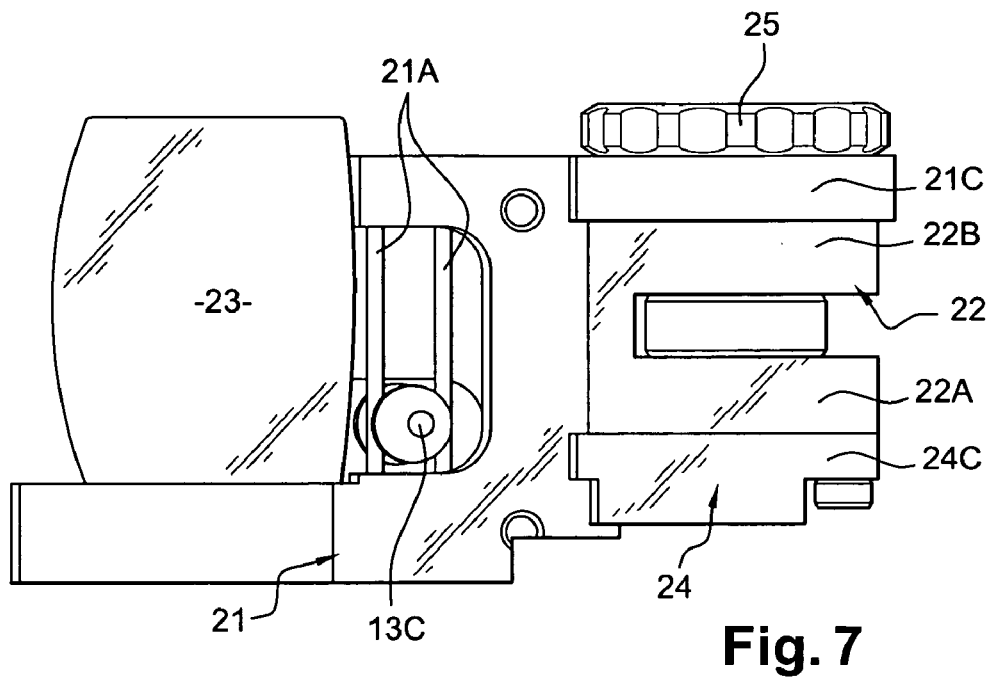
FIG. 7 is a plan view of the same adjusting device.
Figure 8:
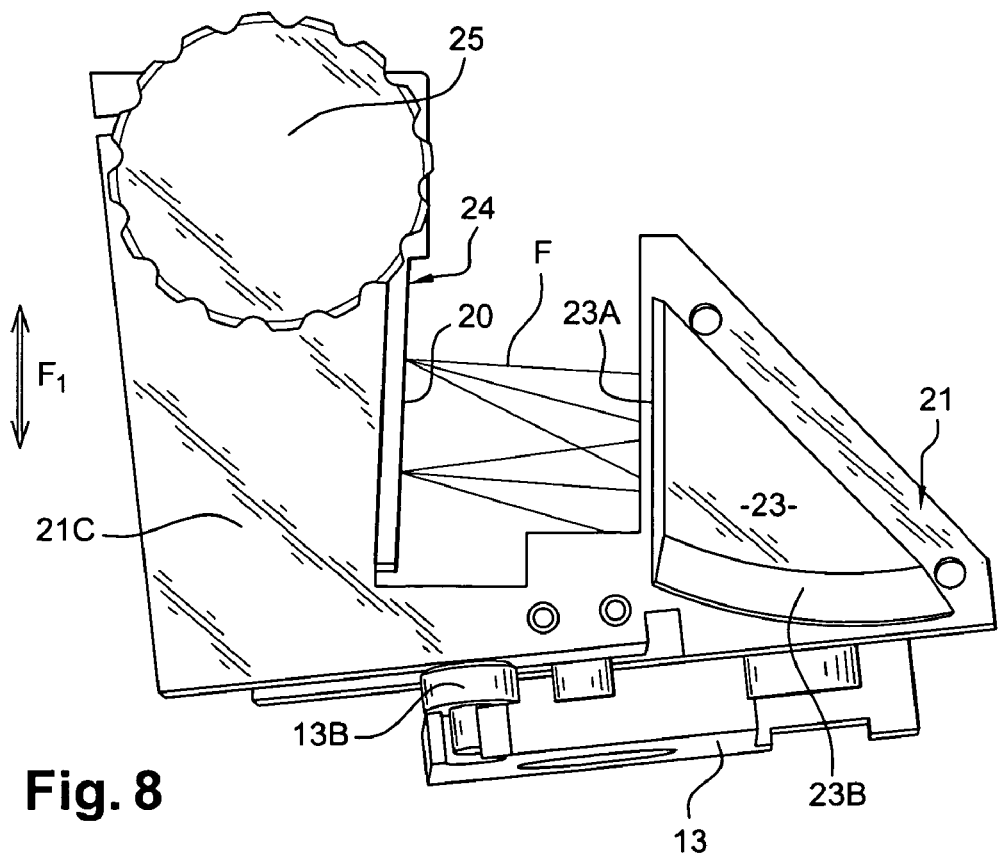
FIG. 8 is a perspective view from behind of the same adjusting device.

This device for adjusting to pupil spacing is shown in greater detail for a preferred embodiment in FIGS. 6 to 8. The housing 30 is not shown therein.

The adapter 13 is a substantially square slab for having its outside face 13A bonded to the lens by adhesive. The stationary plate 21 is secured to the adapter 13 via three studs 13B that are engaged in corresponding orifices in the adapter, as can be seen in FIG. 8. These three studs enable exact relative positioning to be achieved. Furthermore, the adapter 13 includes a snap-fastening peg 13C that is snap-fastened between two resilient rods 21A secured to the stationary plate 21, thereby holding the plate relative to the adapter 13 in releasable manner.

The stationary plate 21 carries the optical component downstream from the miniature screen, more precisely a lens 23. This lens 23 redirects the light beam F it receives from the screen 20 via its face 23A towards the imager included in the eyeglass lens via its face 23B.

The screen 20 is carried by a second plate 24 connected to the stationary first plate 21 via a moving connection constituted by an elastically-deformable element, so as to enable the screen to move in translation along arrow F1 and thus enabling the path of the light beams F to be shifted in translation.

To do this, the stationary plate 21 has a base 21B substantially parallel to the axis of the inlet face 23A of the lens, and a lug 21C perpendicular to said base and disposed on one of its sides. This branch 21C is connected to the first branch 22B of a deformable fork 22 whose other branch 22A is connected to a lug 24C of the second plate 24. These connections are particularly visible in FIG. 7. The lugs 21C and 24C have respective slots at their ends in which they receive pegs carried by each of the branches 22A and 22B.

The branches 22A and 22B can move relative to each other in the direction of arrow F1 under drive from an actuator device external to said housing, and constituted in this case by a knob 25.

Figure 9:
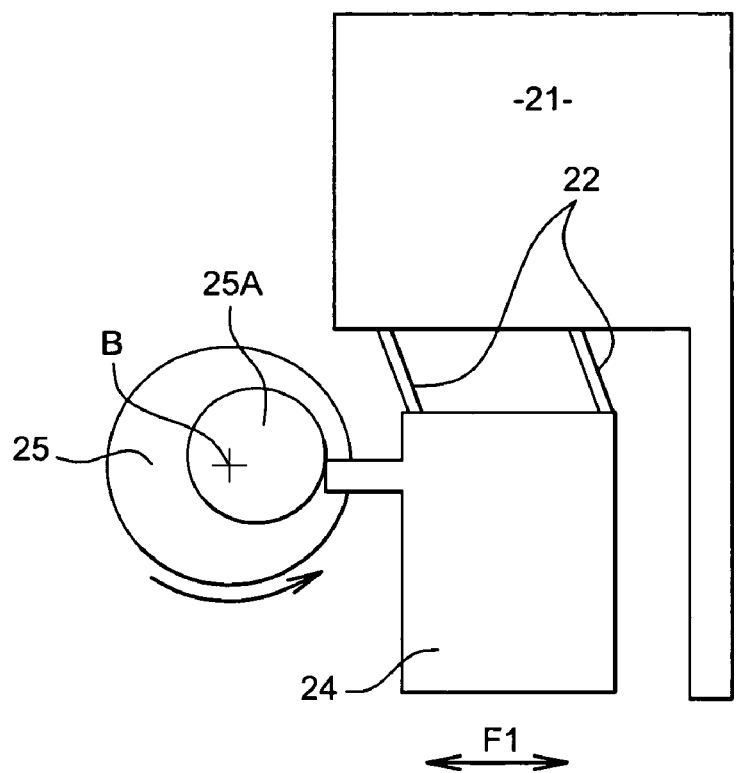
FIG. 9 is a diagrammatic view of a first variant of the actuator device forming part of a display in accordance with the invention.

Although visible solely from the outside in FIGS. 6 to 8, the knob actuator device 25 is shown diagrammatically in FIG. 9 in a manner that can be understood by the person skilled in the art.

This figure shows the stationary plate 21, the moving second plate 24, and the elastically-deformable element 22.

The knob 25 can be turned about its axis of rotation B and it carries an eccentric cylinder 25A which comes into abutment against a face of the second plate 24. As shown more clearly in FIG. 9, during a revolution of the knob, this cylinder pushes against the second plate 24 and then releases it, with the second plate then returning in the opposite direction due to the resilience of the connection 22 so as to remain in abutment against the cylinder 25A.

Figure 10:
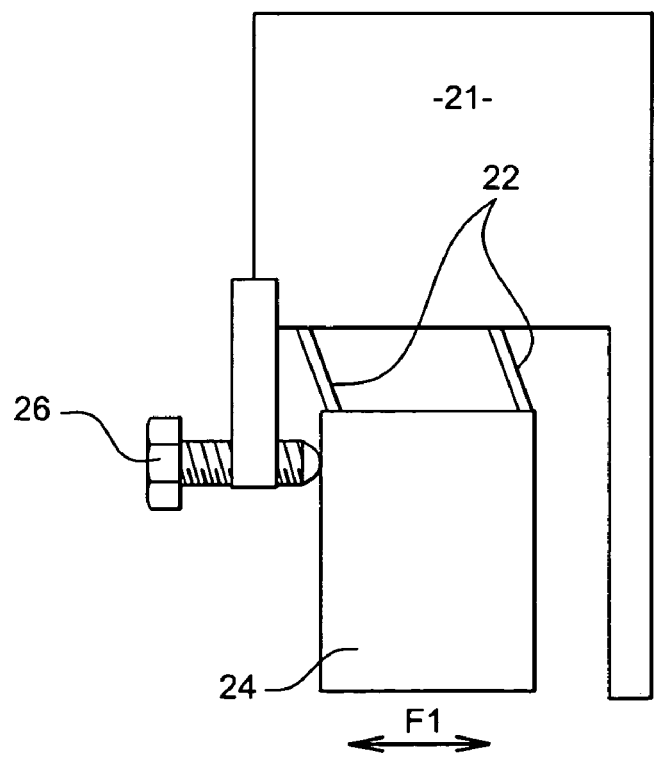
FIG. 10 is a diagrammatic view of a second variant of the actuator device forming part of a display in accordance with the invention.

In a variant, it is possible to use a screw instead of a knob as shown diagrammatically in FIG. 10, or more generally it is possible to use an adjustable abutment. A screw 26 is then screwed into a tapped bore secured to the stationary plate 21, and the end of the screw comes into abutment against a face of the moving plate 24.

Although the housing 30 is not shown in all of the figures, the stationary plate 21 and the second plate 24 are contained in said housing, as shown diagrammatically in FIG. 4.

The invention claimed is:

1. An opthalmological display comprising:
an optical imager for shaping light beams emitted by a miniature screen of a light beam generator system and for directing the beams towards the eye of the wearer so as to enable an image to be viewed, said imager presenting an outlet optical axis, said imager being integrated with a stationary lens for mounting in a frame for eyeglasses, wherein the display includes a device for adjusting to the user's pupil spacing, said device having a means for adjusting the position of said image in a plane substantially perpendicular to said optical axis, said adjustment device being internal to a housing containing said system for generating light beams, wherein said generator system comprises a stationary part, having connected thereto said screen by means of a moving connection in such a manner that said screen can be moved in translation in its longitudinal plane.

2. A display according to claim 1, wherein said screen is secured to a second plate connected to said stationary part via said moving connection.

3. A display according to claim 1, wherein said connection is an elastically-deformable element.

4. A display according to claim 3, wherein said elastically-deformable element is constituted by a deformable fork.

5. A display according to any one of claim 1, wherein said moving connection is adjustable by an actuator device.

6. A display according to claim 5, wherein said actuator device is internal to said housing.

7. A display according to claim 6, wherein said actuator device is constituted by a knob provided with an eccentric cylinder, said knob turning on a stationary portion of the housing and said eccentric cylinder being in abutment against said second plate.

8. A display according to claim 6, wherein said actuator device is constituted by a screw screwed in a stationary portion of the housing and in abutment against said second plate.

9. A display according to claim 1, wherein an adapter is in a reference position relative to the display and receives said generator system provided with its adjustment device by engagement of at least two studs.

10. A display according to claim 9, wherein said adapter is secured to said stationary part.

11. A display according to claim 9, wherein the connection between said system and said adapter is releasable.

12. A display according to claim 1, wherein said stationary part carries an associated optical component.

* * * * *